March 21, 1967 H. W. BOTELER 3,310,282
DIAPHRAGM CONTROL VALVES
Filed Nov. 15, 1965 9 Sheets-Sheet 1
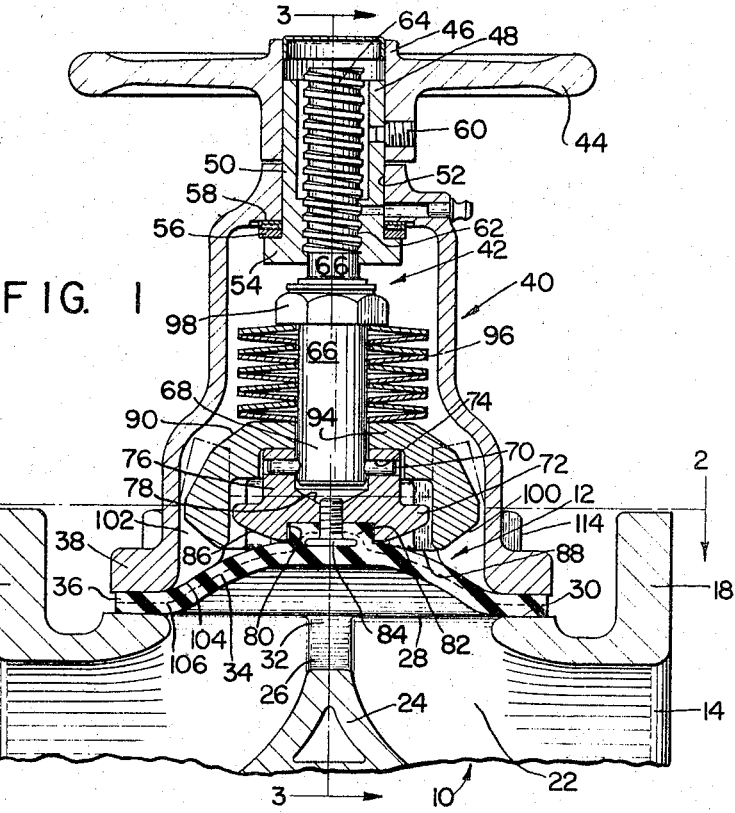
FIG. 1
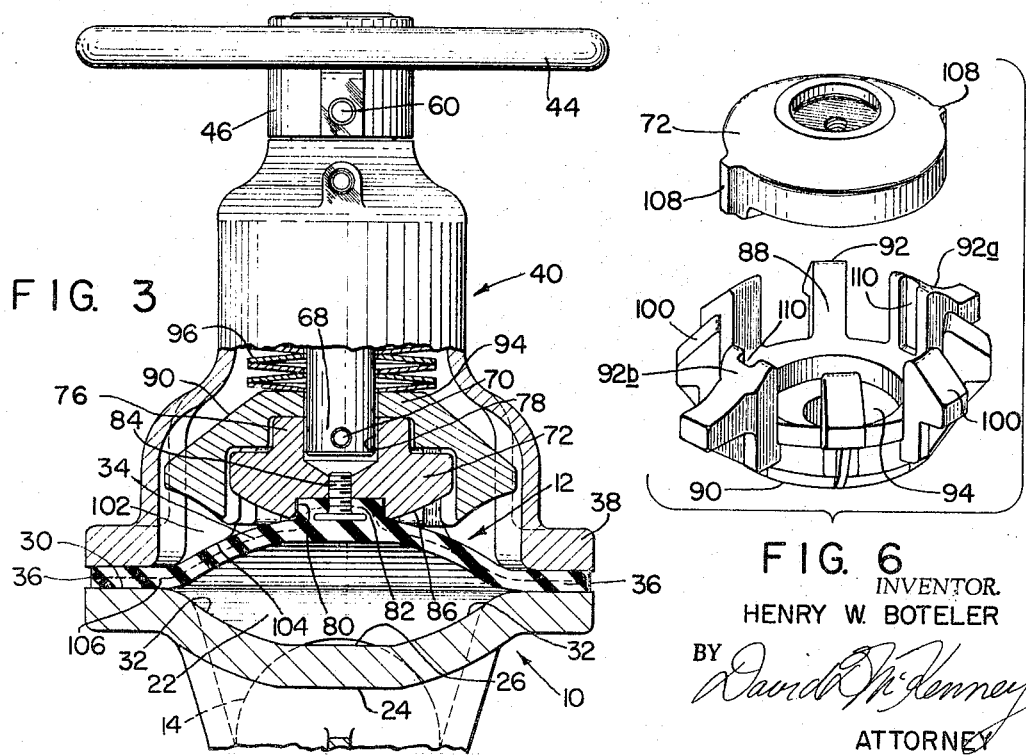
FIG. 3
FIG. 6
INVENTOR.
HENRY W. BOTELER
BY David McKenney
ATTORNEY

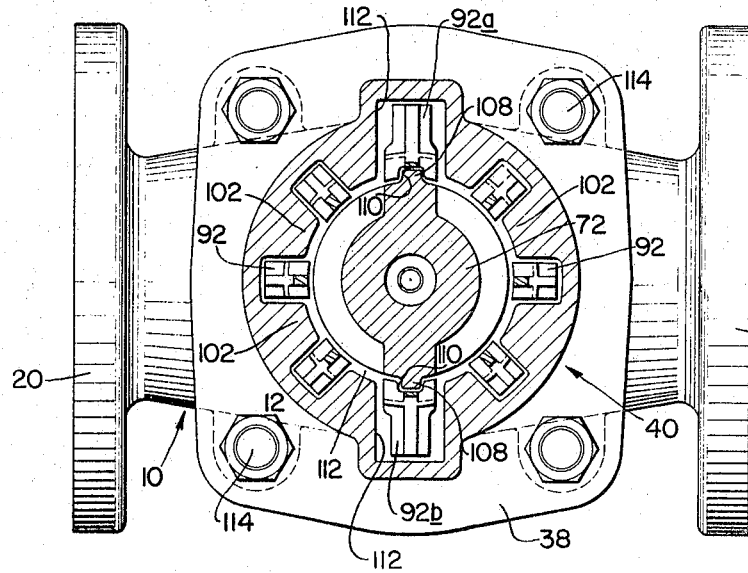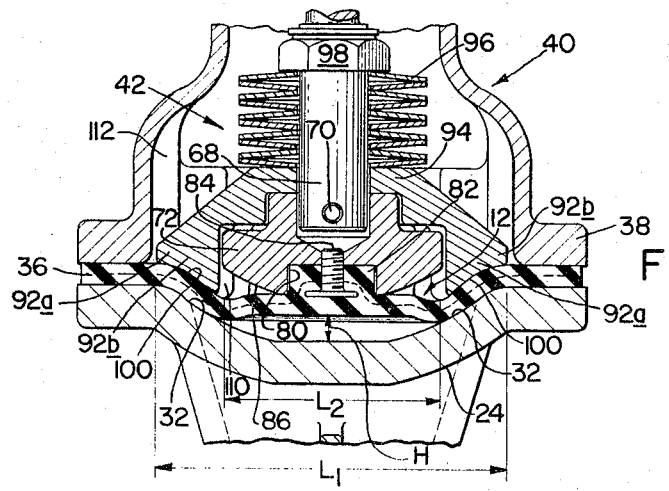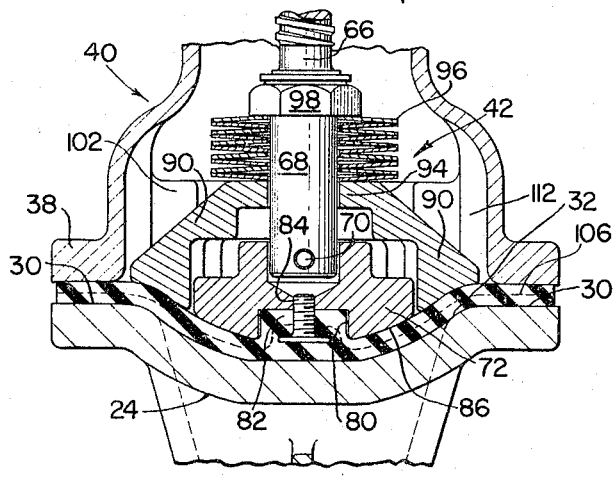

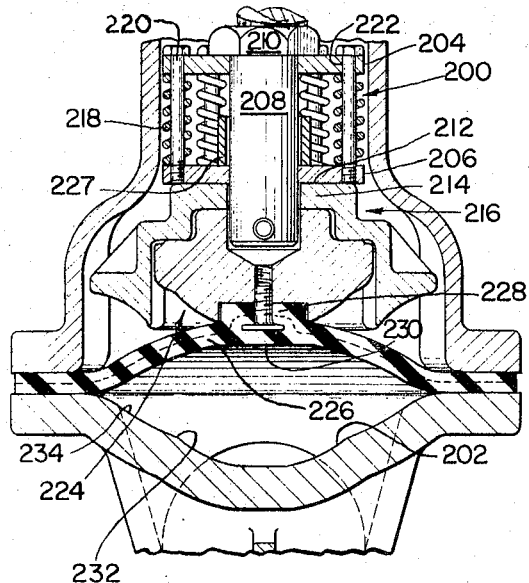
FIG. 8
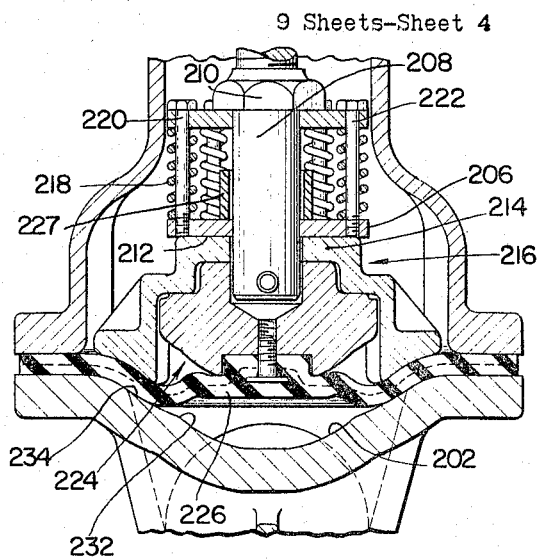
FIG. 9
FIG. 10
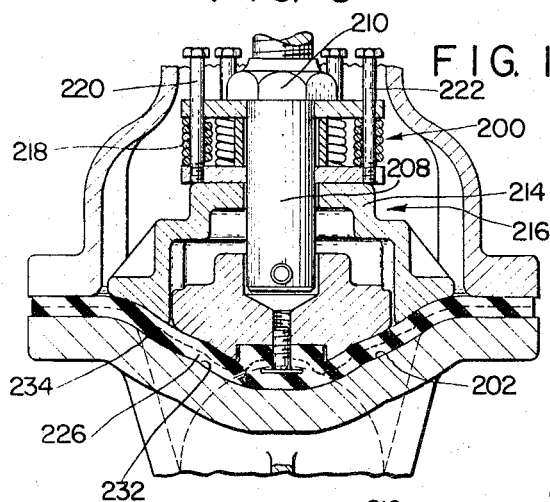
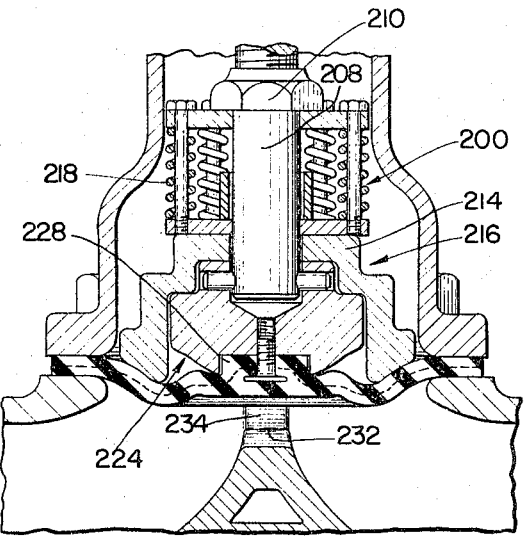
FIG. 11
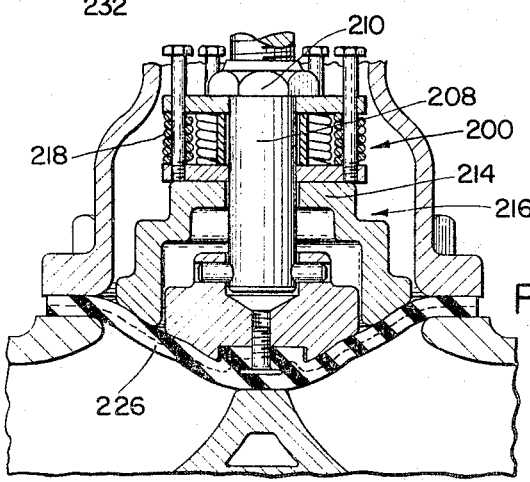
FIG. 12
INVENTOR.
HENRY W. BOTELER
BY
ATTORNEY March 21, 1967 — H. W. BOTELER — 3,310,282
DIAPHRAGM CONTROL VALVES
Filed Nov. 15, 1965 — 9 Sheets-Sheet 7

INVENTOR.
HENRY W. BOTELER
BY David R. McKenney
ATTORNEY

March 21, 1967  H. W. BOTELER  3,310,282
DIAPHRAGM CONTROL VALVES
Filed Nov. 15, 1965  9 Sheets-Sheet 8

INVENTOR.
HENRY W. BOTELER
BY David D. McKenney
ATTORNEY

United States Patent Office 3,310,282
Patented Mar. 21, 1967

3,310,282
DIAPHRAGM CONTROL VALVES
Henry W. Boteler, East Greenwich, R.I., assignor to Grinnell Corporation, Providence, R.I., a corporation of Delaware
Filed Nov. 15, 1965, Ser. No. 514,428
34 Claims. (Cl. 251—331)

This application is a continuation-in-part of application Serial No. 315,944 filed on October 14, 1963, now abandoned.

This invention relates to improvements in diaphragm valves. More particularly, it has to do with a diaphragm valve in which the changes in flow for given valve stem movements are substantially smaller in the nearly closed positions than in comparative prior art diaphragm valves, so that the flow rates are more easily exactly repeated in these positions, in which the most critical portions of the diaphragm seating are less worn nearly closed positions than in prior weir-type diaphragm valves and in which the filtering effect on suspended solids is less marked for given flow rates in the nearly closed positions than in prior diaphragm valves.

One typical diaphragm valve over which the present invention is an improvement comprises a body having end connections with a bore therebetween, having an opening on one side of the passage and having a diaphragm seat within the body opposite this opening. The diaphragm has its periphery sealingly clamped between the rim of the body opening and the flanged open end of a bonnet and has its center portion flexed into and out of engagement with the seat (to close and open the passage) by actuating mechanism housed in the bonnet.

The type of diaphragm valve in which the present invention has its greatest, though not its only, utility is the one in which the seat is formed on the narrow top surface of a weir which is essentially a partial passage barrier integral with the body and extending part way across the bore from the side thereof opposite the opening. This top surface, which is presented toward the opening, is usually a narrow band below the level of the opening rim at its center and curving at its ends toward and blending with such rim. The diaphragm is a layer of some resilient and flexible material such as rubber which has been molded or otherwise formed with its center portion domed toward or away from the weir. To close the valve this center portion is pressed by the actuating mechanism against the weir top surface from one end thereof to the other. In the closed position the sealing of the clamped periphery to the opening rim joins the sealing of the center portion to the weir top surface, thus completing a stoppage of flow in the bore over the weir.

The center of the diaphragm is usually secured to the actuating mechanism so that with withdrawal of the latter pulls the diaphragm from the weir to open the valve. Thus, even though the controlled fluid is usually under a pressure higher than atmospheric this is not relied upon to overcome occasional sticking of the diaphragm to the seat or to move the diaphragm to a fully open position, and to handle vacuum service in which atmospheric pressure actually works to hold the diaphragm in closed position.

Among the great advantages of these diaphragm valves over other types is the fact that the control fluid is completely isolated from the actuating mechanism, the fact that the contours of the bore and seating lend themselves to relatively inexpensive lining with a wide variety of materials, and the fact that the diaphragm can effect complete closure even against relatively large solid particles lodged on the seat. These features together with the availability of excellent diaphragm materials enables the provision of a full line of relatively inexpensive valves for handling fluids which must be kept completely uncontaminated by valve lubricants, for handling corrosive fluids, and for handling fluids having suspended solids.

For a long period of time there has been a demand for diaphragm valves which can satisfactorily automatically control fluid flow, as distinguished from merely fully closing or fully opening a fluid flow line. The difficulty is that in diaphragm valves such control begins to present problems in positions approaching the closed position. One reason for this is that in the prior art diaphragm valves the height of the opening becomes very small relative to the length of the opening as the closed position is approached, and as a result small changes in the positioning of the diaphragm by the valve actuating mechanism produce large percent changes in the flow in these positions.

Where the valve closure members are relatively rigid, as in most globe valves, this difficulty can be overcome by machining the parts to provide a progressive type of closing, for example by using sliding telescoping sealing which reduces the length of the opening simultaneously with the reduction in height. The result in such globe valves is that the percentage change in flow for a given valve stem movement is not substantially different in the nearly closed positions that in the nearly fully open positions. In fact, such sliding seals can be readily prepared which will give exactly the same percentage variation in the flow for a given increment of stem movement in any part of the total range of stem movement. Such a valve is said to have an "equal percentage curve" when flow is plotted against stem movement.

This achievement of an "equal percentage curve" or even of a substantial approach toward such a curve is particularly advantageous because of the widespread use of automatic valve control with actuators and positioners. Valves which can be successfully operated automatically by such devices have come to be called "control valves" to indicate their suitability for such operation. For many years, manufacturing processes have been using large numbers of power operated valves which are controlled from remote stations and often automatically in accordance with some programmed device. This saves the time, labor, and error of manual valve operation, but unless valves can be found having equal percentage curve characteristics or a plurality of other valves can be "cascaded," power operation introduces the problem of controlling error when the process is being run at much less than full capacity and the valves are nearly closed.

Positioner-actuator assemblies which receive an input control signal (pneumatic or electric) and translate it into an actuator position are subject to certain tolerances or errors, but the great majority of these assemblies are "linear" in that for a given increment of input the actuator movement is the same anywhere in its range, and hence in any position within its range the error is substantially the same.

If the same can be said for the flow through the valve controlled by the positioner-actuator assembly, that is if the error in flow is the same percentage of the flow then taking place in any valve stem position, then the manufacturing process can be run at any fraction of full capacity with the same degree of control in the finished product. This, in effect, calls for an "equal percentage curve" valve, and this is what the present invention provides or significantly approaches for the first time in a diaphragm valve.

The novelty of such a characteristic for a diaphragm valve will be better appreciated when it is understood that the characteristic flow curves of prior art diaphragm valves have been the antithesis of "equal percentage," because substantially the entire seating area has been approached and engaged simultaneously.

Quite apart from such "equal percentage curve" considerations, the present invention avoids certain other problems which have long plagued diaphragm valves, namely (1) the filtering effect of the long narrow valve openings which occur in those positions where the flow is considerably reduced but is still substantial and (2) the adverse effect on proper closure of the wear which occurs at the ends of the weir and which is caused by high velocity flow. The filtering effect is the result of trapping of solids suspended in the fluid, for example, paper pulp, which solids are unable to pass through the narrow opening although the fluid carrying these solids leaches through. The resulting jam-up of the solids either plugs the line at the valve eventually or at best creates a mass of solids which is swept down the line when the valve is subsequently opened further.

The wear at the weir ends is the result of the high velocities developed by the narrow openings. The relatively hard valve body materials and linings are particularly susceptible to such wear which is often called "wire drawing," but even the softer surfaces of lined valves can be effected in this way. Such wear is particularly bothersome at or near the weir ends because sealing of the diaphragm against the seat has always been more difficult here than in the center of the weir. At the center of the weir the irregularities caused by such wear can be overcome by extra squeezing of the diaphragm.

The present invention can be employed to achieve or approach the equal percent curve characteristics referred to. It can also be employed to overcome the filtering and wear disadvantages by providing a diaphragm valve construction in which portions of the diaphragm are completely seated while other portions remain substantially unseated and at a substantial distance from the seat. In a preferred embodiment these objectives are achieved by pressing the diaphragm to the ends of the weir and holding the center of the diaphragm substantially away from the weir to thereby reduce the length of the opening in the nearly closed positions. As a result the cross-sectional area of the opening, although the same as in the corresponding nearly-closed position of a prior art diaphragm valve, is shorter and higher. This can cause the flow characteristic to follow or substantially approach an equal percentage curve, can eliminate filtering and can prevent wire-drawing wear at the weir ends.

One construction of such a preferred embodiment employs a two-piece compressor in which a center piece telescopes within a central recess in an outer piece and is movable with respect thereto between a withdrawn position and an advanced position. During closing a spring holds the center piece in the withdrawn position until the outer piece has pressed portions of the diaphragm against the weir ends. Thereafter the center piece moves relative to the outer piece toward its advanced position to press the remainder of the diaphragm against the center of the weir and deform the spring. During opening the reverse operation takes place, the spring holding the outer compressor piece in closed position until the center compressor piece has been moved to withdrawn position relative thereto (to lift the diaphragm center), and thereafter the outer piece is engaged and itself lifted by further movement of the center piece.

In another construction the spring may be dispensed with by connecting each of the two compressor pieces to a different actuator. During closing one actuator holds one compressor piece in a withdrawn position with respect to the other compressor piece until the other actuator has moved this other compressor piece to its closed position in which it presses portions of the diaphragm against the seat. Thereafter the first-mentioned actuator moves the one compressor piece relative to the other toward its advanced position to press the remainder of the diaphragm against the seat. During opening the other actuator holds the other compressor piece in closed position until the one compressor piece has been moved to its withdrawn position relative thereto (to lift a part of the diaphragm), and thereafter the other compressor piece is engaged and lifted by further movement of the one compressor piece.

In still another construction the one compressor piece is not employed to move the other. Here again each compressor piece may be connected to a different actuator. During closing one actuator may hold one compressor piece in a withdrawn position with respect to the other compressor piece until the other actuator has moved the other piece to its closed position in which it presses portions of the diaphragm against the seat. Thereafter the first-mentioned actuator may move the one compressor piece relative to the other toward its advanced position to press the remainder of the diaphragm against the seat. During opening the other actuator may hold the other compressor piece in its closed position until the one compressor piece has been moved to its withdrawn position relative thereto (to lift a part of the diaphragm) and thereafter the other actuator may lift the compressor piece.

In view of the foregoing it is one object of the present invention to provide an improved diaphragm valve in which a portion of the diaphragm is completely seated while another portion is substantially spaced from the seat.

Another object is to provide a diaphragm valve of the kind described in which the diaphragm has a central seating portion and an outer seating portion therearound, and in which in the nearly closed positions the outer diaphragm portion is completely seated while the central portion is held a substantial distance above the seat.

Another object is to provide a diaphragm valve of the kind described wherein the diaphragm compressor is formed in at least two pieces which are relatively movable with respect to each other and in which one piece is movable when another piece is stationary.

Another object is to provide a diaphragm valve of the kind described wherein the compressor piecs are spring loaded into one relative position with respect to each other.

Another object is to provide a diaphragm valve of the kind described wherein the compressor pieces are spring an outer annular piece engaging the outer diaphragm portion and another compressor piece is a central part telescoped therein and engaging the central diaphragm portion.

Another object is to provide a diaphragm valve having for a diaphragm seat a concave weir surface extending across the bore, the ends of which surface substantially follow one curve and the center of which substantially follows a different curve.

Another object is to provide a diaphragm valve of the kind last described in which the center of the weir surface has a concavity superimposed on the concavity of the remainder of the weir surface.

Another object is to provide a diaphragm valve of the kind last described in which the diaphragm has a central thickened portion and a surrounding thinner flexible portion and in which the latter extends inwardly from the diaphragm periphery at least to the juncture of the two different weir surface concavities.

Another object is to provide a diaphragm valve in which portions of the diaphragm are seated at different times during valve closing to such a degree and extent and in such a manner that for a given increment of valve stem movement in any part of the total range of such movement between fully open and fully closed positions the percent change in flow is substantially the same.

Another object is to provide a diaphragm valve of the kind last described in which the percentage change in flow is less than substantially ten percent for a one percent change in stem movement.

Another object is to provide a diaphragm valve in which portions of the diaphragms are seated at different times during valve closing to such a degree and extent and in such a manner that for a given increment of valve stem movement in the nearly closed positions the change in flow is substantially less than the same increment of flow in the half open positions.

Other objects will appear hereinafter.

The best modes in which I have contemplated applying the principles of the present invention are shown in the accompanying drawings, but these are to be deemed primarily illustrative for it is intended that the patent shall cover by suitable expression in the appended claims whatever of patentable novelty exists in the invention disclosed.

In the drawings:

FIGURE 1 is a fragmentary cross-sectioned side elevation view of one embodiment of the present invention;

FIGURE 2 is a cross-sectioned top-plan view taken on line 2—2 of FIG. 1;

FIGURE 3 is a fragmentary cross-sectioned end elevation view taken on line 3—3 of FIG. 1, showing the positions of the parts when the valve is in open position;

FIGURE 4 is a view like FIG. 3, but showing the positions of the parts when the valve is partially closed;

FIGURE 5 is a view like FIG. 3, but showing the positions of the parts when the valve is completely closed;

FIGURE 6 is an exploded perspective view of the compressor parts employed in the embodiment of FIGS. 1 to 5;

FIGURES 8, 9 and 10 are cross-sectioned end elevation views of another embodiment of the invention showing the valve in open, partially closed, and fully closed, respectively, and differing from the earlier embodiment primarily in the form of the weir, diaphragm, and compressor;

FIGURES 11 and 12 are cross-sectioned side elevation views corresponding to FIGS. 9 and 10, respectively;

Figure 7:
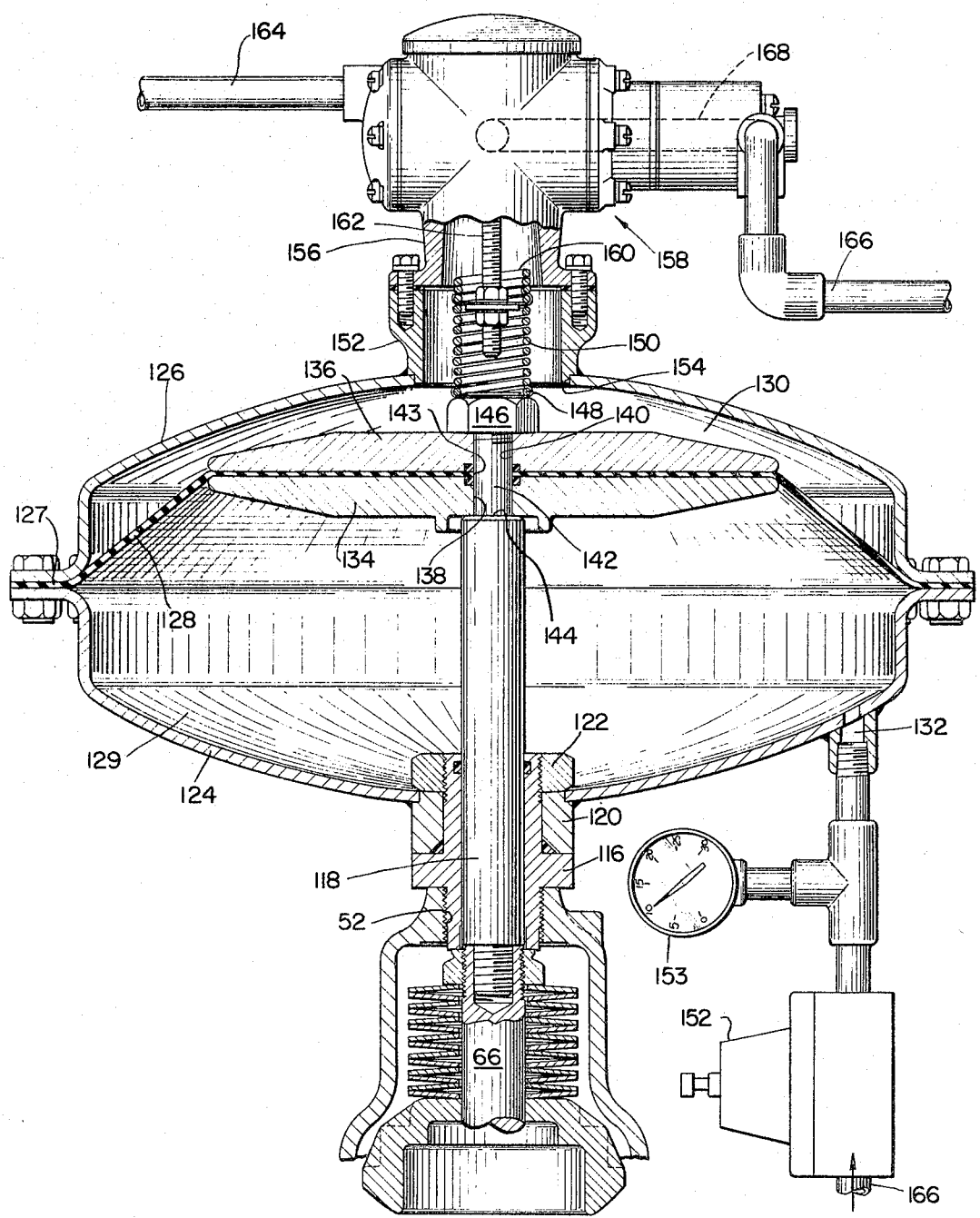
FIGURE 7 is a partially sectioned side elevation view of a positioner-actuator assembly mounted on a valve like that of FIGS. 1 to 6.

Referring now more particularly to the drawings, and first to the embodiment of FIGS. 1 to 6, the body 10 and diaphragm 12 are of a conventional design, the body having a pair of end openings 14 and 16 provided with flanges 18 and 20 by which the body is connected to pipe sections (not shown) having similar flanges. The end openings are connected by a flow passage 22 which is cylindrical at its ends and which is interrupted by a weir 24 formed on one side of the body. The top weir surface 26 is presented toward a diaphragm opening 28 which is formed in the opposite side of the body and which has a rim 30 therearound toward which the weir surface ends 32 curve and into which these weir surface ends blend. The weir surface 26 serves as a seat for the diaphragm which is preferably a molded rubber or rubber-like material in substantially the shape of FIG. 1, that is, with a domed central portion 34 and a flat peripheral portion 36 clamped between the rim 30 and a corresponding flange 38 on the end of a special bonnet 40.

This bonnet 40 houses a valve actuating mechanism 42 which in this embodiment is operated by a handwheel 44. More particularly, the handwheel is mounted on the upper end of the bonnet 40 and has an apertured hub 46 receiving therein the upper end 48 of a bushing 50 which extends rotatably through a journal opening 52 provided in the end of the bonnet remote from the flange 38. The other lower end 54 of the bushing is flanged radially outwardly as shown and confines a thrust bearing 56 against the interior surface 58 of the bonnet end wall. The handwheel hub 46 is secured to the bushing end 48 by a set screw 60 so that rotation of the handwheel rotates the bushing in the bonnet opening 52.

The bushing 50 is internally threaded at 62 to receive the upper threaded end 64 of a valve stem 66 which has its lower end 68 connected by a cross pin 70 to a central compressor piece 72. This pin has a snug fit in the stem and extends from either side thereof to lie in suitable journals 74 formed in an upstanding compressor piece boss 76 which has a central recess 78 for receiving the stem end 68.

On the other side from recess 78 the central compressor piece 72 has another smaller recess 80 which accommodates a boss 82 on the back side of the diaphragm at the center thereof and which has an axial threaded hole at the bottom thereof for connection to a threaded stud 84 embedded in this diaphragm boss. The compressor piece under surface 86 which is adjacent a portion of the back side of the diaphragm is curved to conform to the shape of this portion when the diaphragm is in the closed position shown in FIG. 5. This curvature of surface 86 is essentially a mere reversal of the curvature of the back side of the diaphrgam when the latter is in the open position of FIG. 1.

The entire compressor piece 72 fits entirely with a recess 88 in a larger compressor piece 90 which, in this embodiment, has a plurality of separate equally spaced finger portions 92 defining the recess 88 and which has an apertured hub portion 94 slidingly accommodating the stem 66. In the positions of the parts shown in FIGS. 1 and 3 this hub portion 94 is engaged on its inner surface (at the bottom of recess 88) by the central compressor piece boss 76 and on its opposite outer surface by one end of a nest of disc springs 96 compressed between this latter surface and a nut 98 threaded onto the stem below the threads 62. An initial compression in these springs serves to hold the compressor pieces 72 and 90 firmly in the positions (relative to each other) shown in FIG. 1.

The surfaces 100 which are on the compressor finger portions 92 and which are presented toward the back side of the diaphrgam are curved in the same general way as the corresponding surface 86 for the center compressor piece 72 so that when the compressor pieces 72 and 90 are in the positions shown in FIG. 5 these two surfaces engage the back side of the diaphragm and press the diaphragm against the weir surface 26 along its entire length.

The larger compressor piece is segmented into the finger portions 92 so that they can fit between similar finger portions 102 formed integrally on the interior surface of the bonnet near the lower end thereof and outstanding from this surface part way toward the center of the bonnet. The under-surfaces 104 of these bonnet finger portions are curved to support as much as the back side of the diaphragm as possible when the diaphragm is in the fully open position shown in FIG. 1. This aids the diaphragm in withstanding the pressure in the line when the valve is open and the compressor assembly only supports the diaphrgam at the center. A layer of fabric reinforcement 106 molded into the diaphragm also gives the diaphragm strength against bursting under such pressure.

FIG. 2 shows how the compressor finger portions 92 fit between the bonnet fingers 102 with enough clearance to permit easy vertical movement, and such interfitting also prevents any rotation of the compressor piece 90 which might tend to take place upon rotation of the handwheel. Inevitable friction between the stem 66 and bushing 50 provides a rotational tendency in the stem, but the center compressor piece 72 has two opposed outstanding ribs 108 which slidingly fit in grooves 110 formed in an opposed pair of the compressor finger portions 92a and 92b. By this arrangement the compressor piece 72 is free to move vertically in the recess 88, but is prevented from rotating with respect thereto, and since the compressor piece 90 is also prevented from rotating by the bonnet finger portions 102 the result is that the stem is prevented from rotation but is free to move vertically when the handwheel and bushing are turned.

The compressor finger portions 92a and 92b are also characterized by being longer than the other finger portions, the reason being that these compressor finger portions lie along the weir 24, and by having them longer and fitting into vertical grooves 112 in the bonnet interior surface a better bridging is achieved between the seal achieved at the clamped diaphragm margin and the seal achieved at the weir ends.

The bonnet flange 38 is secured to the body flange surface 30 by bolt and nut assemblies 114.

The operation of the above-described construction is as follows: Rotation of the handwheel 44 in one direction drives the stem 66 downwardly, initially carrying the two compressor pieces downwardly in the same positions relative to each other which are shown in FIG. 1, these pieces being held in these positions by the force of the nested springs 96. Because the central compressor piece 72 is in its retracted position within the recess 88 the surfaces 100 of the compressor finger portions 92 fully engage the back side of the diaphragm before the corresponding compressor piece surface 86 engages this back side. This is illustrated in FIG. 4 which shows particularly well how the diaphragm is confined between the surfaces 100 of finger portions 92a and 92b and the ends 32 of the weir, while at the same time the center of the diaphragm is held a substantial distance from the weir by its stud attachment to the central compressor piece 72. Further advance of the stem from the position shown in FIG. 4 presses the compressor finger portions against the diaphragm via the nested springs 96 and nut 98, and when the force thus exerted exceeds the initial pre-load in these springs they are further compressed, and the central compressor piece 72 begins to move downwardly in the recess 88 and relative to the outer compressor piece 90. The ultimate result is the closing of the center of the diaphragm against its seat as shown in FIG. 5.

From the foregoing it will be seen that the closing of the diaphragm against its seat on the weir is sequential. First the entire diaphragm moves toward the seat. Next a portion of the diaphragm is firmly seated while the remainder is still spaced substantially from the seat and finally the remainder is also firmly seated.

In opening the valve of FIGS. 1 to 6 the reverse of the above-described closing takes place. The withdrawal of the stem 66 initially lifts the central compressor piece 72 while the nested springs 96 continue to press the finger portions 92 of the larger compressor piece against the diaphragm and hold it firmly closed at the weir ends although the spring force is diminishing as the stem moves upwardly. Continued withdrawal of the stem continues to pull the central compressor piece 72 into the recess 88 and the larger compressor piece continues to hold the diaphragm seated at the ends of the weir, until the positions of FIG. 4 are obtained in which the center of the diaphragm is spaced substantially from the weir, and the boss 76 on the central compressor piece engages the bottom of the recess 88. Thereafter any additional upward movement of the stem 66 lifts both compressor pieces as a unit toward the fully open position of FIG. 1.

This handwheel actuated embodiment of FIGS. 1 to 6 suffices to illustrate one advantage of the present invention, namely the avoidance of filtering out suspended solids by the achievement of a relatively short opening in the nearly closed positions. Thus, in FIG. 4, $L_1$ designates the length of the openings in the prior art in all positions of the diaphragm including the nearly closed positions, whereas $L_2$ designates the length of the openings in this embodiment in the positions between FIG. 4 and FIG. 5.

Such a short opening length means that the opening height H will be greater for a given cross-sectional area, and hence in those applications where solids are suspended in the fluid being controlled the trapping of such solids will not take place until the flow rates are much lower than in the prior art diaphragm valves. An example of such solids is to be found in the paper industry where pulp is conducted through lines having diaphragm valves and where these valves frequently have to be operated in their nearly closed positions. With the prior art diaphragm valves many of the nearly closed positions which had to be used acted as filters for the solids in the pulp, trapping these solids and allowing the water to leach through, with the result that the solids would dam up at the weir and plug the valve. This either closed off the flow, or at best provided a lump of solids which passed downstream as a bunch when the valve was subsequently opened wider. The present invention avoids these problems in the prior art over a wider range of valve positions because the filtering effect does not begin until the flow values are much less. This is a result of the sequential closing of different diaphragm portions in the embodiment of FIGS. 1 to 6.

This handwheel embodiment of FIGS. 1 to 6 also suffices to illustrate another advantage of the present invention, namely the substantial confinement of "wire drawing" wear to the center of the weir. Because of the sloping ends of the weir top surface and because of the inevitable bridging required between bonnet and compressor squeezing at the ends of the weir, closing the diaphragm against irregularities on the seating surface has always been the most difficult at the weir ends in the prior art diaphragm valve. Accordingly, when the prior art valves are barely open and fluid is passing over these critical seating areas at high velocity the wear, or "wire drawing" as it is often called, results in very unwanted irregularities in these areas, and this is particularly true in a body made of hard materials or covered with a hard lining.

With the arrangement of FIGS. 1 to 6 in these critical areas the wear at the weir ends is less and closing is correspondingly easier. In this embodiment there is still one stem position where the diaphragm is only slightly spaced from the weir ends, but in this position the center of the diaphragm is open quite wide so that wear-producing velocities are not as high for given pressure conditions.

Another advantage of the present invention is illustrated best with reference to the construction and operation of the actuator-positioner assembly shown in FIG. 7. The purpose of the actuator is to move the valve stem automatically. The purpose of the positioner is to control the operation of the actuator in accordance with some input signal. In FIG. 7 the actuating mechanism of FIG. 1 has been modified by discarding the handwheel 44 and bushing 50 and substituting therefor a journal sleeve 116 and stem extension 118. The sleeve is threaded into the threaded bonnet opening 52 which has been threaded to receive it, and the stem extension 118 is similarly threaded into the old stem 66 and slides in the sleeve 116. Through a series of mounting members 120 and 122 whose construction is sufficiently clear from the drawings to be readily understood a base is provided for a pair of dished casing parts 124 and 126, flanged, opposed and clamping between them the periphery 127 of a flexible diaphragm 128. In this way a pair of pressure chambers 129 and 130 are formed.

The center of the diaphragm 128 is sealingly clamped between a pair of flat plates 134 and 136 centrally apertured at 138 and 140 and penetrated by the reduced end 142 of the stem extension 118. The diaphragm 128 also has an aperture 143 to receive this end. This plate and diaphragm assembly is held firmly against the shoulder 144 resulting from the reduced end 142 by a nut 146 threaded thereon. This nut 146 also serves as a connection for the lower end 148 of a positioner "range" spring 150 which extends vertically upward through a cylindrical collar member 152 welded to an opening 154 in the casing part 126. The collar 152 serves as a mounting for the base 156 of a positioner 158, and the upper end 160 of the range spring 150 is connected to a depending rod 162 which also forms a part of the internal positioner mechanism.

The remainder of the internal positioner mechanism is not shown because the precise construction of a suitable positioner forms no part of this invention and is well-known to persons skilled in this art.

The characteristic of the actuator-positioner combination which is important for explaining this advantage of the present invention is the constancy of the tolerances in the positioning of the stem extension 118 (and hence the valve stem 66) throughout the range of stem movement. Thus, the positioner 158 receives, through intake conduit 164, an input signal which, in this kind of positioner, is a value of air pressure between about 3 and 15 p.s.i., this input signal usually having been obtained from a transducer (not shown).

A higher supply pressure from a conduit 166 is modulated by the positioner in accordance with the value of the input signal and is led to the upper chamber of the actuator by conduit 168. If this modulated pressure results in a change in the position of the plates 134 and 136, and hence in a movement of the valve stem 66, the change in tension in the range spring 150 resulting from such movement establishes a new equilibrium for the parts in the positioner at the new input pressure. The lower chamber 129 in the actuator contains a constant pressure air cushion which tends to move the valve to its open position and which, with the modulated supply pressure in the upper actuator chamber and any forces exerted by the valve, achieves an equilibrium condition. The air cushion is achieved by leading air from the same supply pipe 166 through a pressure regulator 152 and through port 132 in the lower casing part 124. A gauge 153 indicates the pressure of the air cushion.

For each value of input air pressure in intake conduit 164 there is a different valve stem position achieved, and in this, as well as most positioner-actuator assemblies sold today, the relationship is linear. In other words a unit change in input signal from any value of input signal produces the same amount of change in the movement of the stem extension 118.

If the control of the system is such that there is no loop, that is to say if the input signal is not effected by changes in flow through the valve, then it is desirable to have tolerances in the positioner-actuator produce a low percentage error in flow in the nearly closed valve positions as well as in the nearly open valve positions. It is also desirable to have these tolerances produce the same low percentage error in flow over a large range of valve positions. For example, if the input signal to the positioner 158 is manually controllable and the process of which the valve forms a part is to be run at some fraction of full capacity, there will be some difference, or error, in flow between the actual rate of flow and the rate which the operator wants. The object is to design the system so that this tolerance is within acceptable limits, and this design problem is complicated by the fact that as the valve is closed to decrease capacity the same excess or deficiency in flow which represented a tolerable error at, for example, two thirds capacity would be a much larger percentage of the flow at one third capacity and might be intolerable in the nearly closed positions.

What is needed to solve this design problem is an equal percentage relationship between the input signal and the valve flow, and since positioner-actuator assemblies customarily have the linear relationship referred to it remains for the valve to approach or actually provide a so-called "equal percentage" relationship. The present invention enables a diaphragm type valve to do this.

If the control system is a loop, so that the input signal is effected by the flow through the valve, it is just as desirable to have positioner-actuator tolerances produce small percent flow errors in the nearly closed positions and for these percent flow errors to be substantially the same in all positions. For example, if the input signal to the positioner is effected in part by the flow through the valve, then as long as any other flow-effecting factors remain constant an equilibrium flow condition will be reached in which, in theory, the input signal calls for exactly the amount of flow being delivered through the valve. In practice there will be hunting around this "control point," and the magnitude of the hunting depends on the response characteristics of the mechanisms in the positioner and actuator. These characteristics are generally the same over the entire range of input signals so that the magnitude of stem movement during hunting is the same throughout the full range of stem movement. The hunting results in errors in flow, and again the system is originally designed so that these errors are tolerable. Again, however, it will be apparent that percentage-wise the hunting is worse for the small flow rates unless the valve has an equal percentage characteristic.

Figure 13:
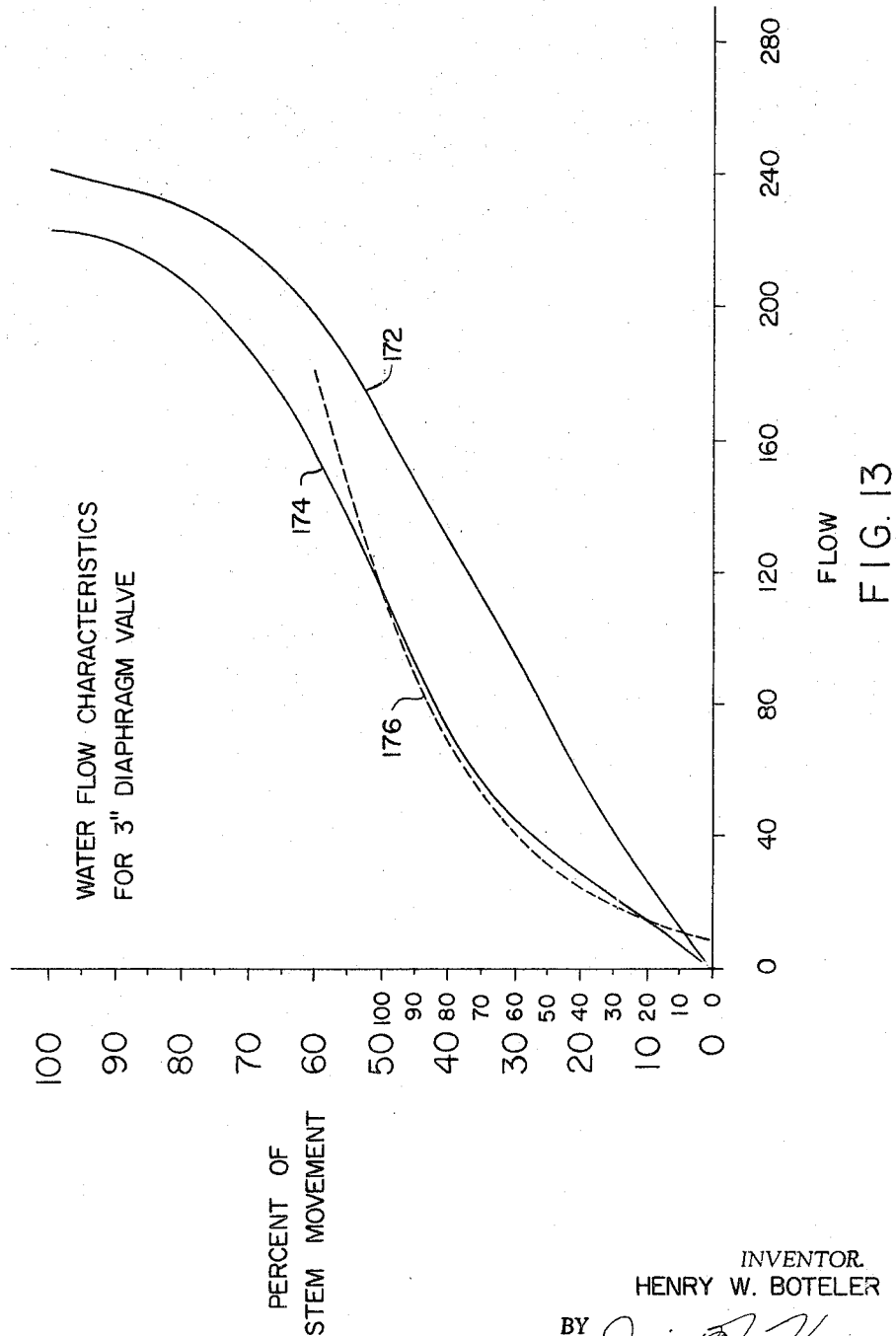
FIGURE 13 is a graph showing the relationship between valve stem position and flow for the embodiment of FIGS. 1 to 7.

In general the prior art diaphragm valves have not been regarded as ideal for use as control valves because their characteristics have been so far away from the equal percentage relationship. FIGURE 13 is a graph plotting valve stem position in percent against flow in gallons per minute, and shows in curve 172 a typical flow characteristic for such a prior art diaphragm valve. Curve 174 shows the characteristic of the valve of FIGS. 1 to 6, and a third equal percent curve 176 has been added to show how close to an equal percent characteristic the valve of FIGS. 1 to 6 comes. This particular equal percent curve 176 produces a 6.6% change in flow for each 1% change in stem position when the full extent of the valve stem movement is considered, or a 3.3% change in flow for each 1% change in stem position when half of the valve stem movement is considered.

Half of the total valve stem movement may be fairly considered here because the total flow in half opened position of any diaphragm valve is often as great or greater than in the fully open position of any other type of control valve of the same size. As will be explained later herein, there is no particular disadvantage in having the curve 174 depart as it does from curve 176 in the upper half of the stem movement, but for purposes of comparison with other kinds of control valves of the same size it is fair to say that the valve of FIGS. 1 to 6 has an equal percent characteristic of 3.3% change in flow for each 1.0% change in stem position, rather than 6.6%. However, hereinafter when reference is made to stem positions in FIG. 13 the percent values mentioned for stem position are those in the larger numbers.

In comparison with the nearly equal percent portion of curve 174 for the valves of FIGS. 1 to 6 the prior art valve with the characteristic of curve 172 has an 11.1% increase in flow for a stem movement from 10% to 11%. This percent change in flow for the same increment of stem movement becomes smaller on curve 172 as the valve opening increases to the half open position, but not smaller than 6.6% of the present invention, and it is the high percentage changes in flow in the nearly closed positions which are objectionable.

The upper ends of curves 172 and 174 (beyond the half open position) show that in the diaphragm valves of the prior art and the present invention the flow continues to increase as the opening movements of the diaphragms approach the wide-open position of FIGS. 1 and 3. There is, however, progressively less increase flow for each increment of opening movement as the wide open position is reached.

This upturn of the curve 174 causes it to lose its equal percentage characteristics. For exmaple, the extension of curve 176 beyond the half-open position shows how the equal percentage curve 176 would continue for additional opening stem movements. However, though not preferred, this kind of departure by curve 174 is not particularly detrimental because in this upturned end portion of curve 174 the percent changes in flow for given increments of stem movement are all less than the percentage value (6.6% of flow for 1% of stem movement) in the lower equal percentage portion of the curve. Stated another way it is not a disadvantage to have smaller flow changes for given stem movements except to the extent that where there is a loop as previously described greater stem movements are required to produce the same changes in flow, and hence the positioner-actuator assembly must move more in the valve's over-half-open range. These greater movements may cause somewhat more hunting.

Referring now to FIGS. 8 to 12, these show another embodiment of the invention which is similar to the embodiment of FIGS. 1 to 6, but has a different spring arrangement 200 and a differently shaped weir top surface 202.

The spring arrangement 200 is made up of a pair of apertured end plates 204 and 206 which fit slidingly on the stem 208 between the nut 210 and the upper surface 212 of the end wall 214 of the larger compressor piece 216. The plates are urged apart by helical compression springs 218 retained on bolts 220 which slide through openings 222 in the plate 204 and are threaded into other openings in plate 206. FIG. 8 shows the relative positions of these parts when the valve is in its wide open position. FIGS. 9 and 11 show that initial downward movement of the stem 208 moves the entire compressor assembly downward without changing the relative positions of the larger compressor piece 216 and the central compressor piece 224. The lengths of the rods 220, the lengths of the springs 218 and the thicknesses of the plates 204 and 206 are chosen with respect to the distance between surface 212 and nut 210 so that the two compressor pieces are held firmly together in the positions of FIGS. 8, 9 and 11. This relationship can be partially assured by having a little clearance between the heads of the bolts 220 and the plate 204 in FIGS. 8, 9 and 11 and by having the free lengths of the springs 218 at least slightly longer than the lengths shown in FIGS. 8, 9 and 11.

When the downward movement of the stem 208 has brought the compressor assembly into the position shown in FIGS. 9 and 11 the larger compressor piece 216 has pressed part of the diaphragm 226 into engagement with the ends of the weir. The result is that compressor piece 216 cannot moved downwardly much farther whereas piece 224 is free to continue down and does so with the result that springs 218 are compressed. This compression increases the squeeze on the seated portions of the diaphragm, which is desirable, until the central compressor piece 224 has moved the remainder of the diaphragm into seating engagement to complete the closure. The central compressor piece does not act through any spring and hence the squeeze it exerts is very positive. However, the springs 218 are chosen to be strong enough to give adequate squeeze when deflected as shown, or they can be designed to go to solid height when the central compressor piece begins to do its squeezing, or a loose sleeve 227 can be provided around stem 208 to provide a solid connection between plates 204 and 206.

As to the top weir surface 202 the feature in this embodiment of FIGS. 8 to 12 is the weir within a weir. In conventional diaphragm valves the diaphragm boss 228 adds such thickness to the center of the diaphragm that no particular attempts have been made to flex it. As a result the center 230 of the diaphragm seating surface is customarily flat and the corresponding weir surface as well. This is shown in the embodiment of FIGS. 1 to 6.

I have discovered, however, that this thicker diaphragm central portion can be successfully distorted to some extent, enough, for example, to engage a top weir surface 202 which has been concaved below the conventional flat weir surface portion, and this special shaping is a furtherance of the present invention because it provides a control of the cross-sectional area of the valve opening in the nearly closed positions. The weir-within-a-weir feature results in a juncture 232 between the curvature at the weir ends 234 and the curvature of the weir center 202.

Figure 14:
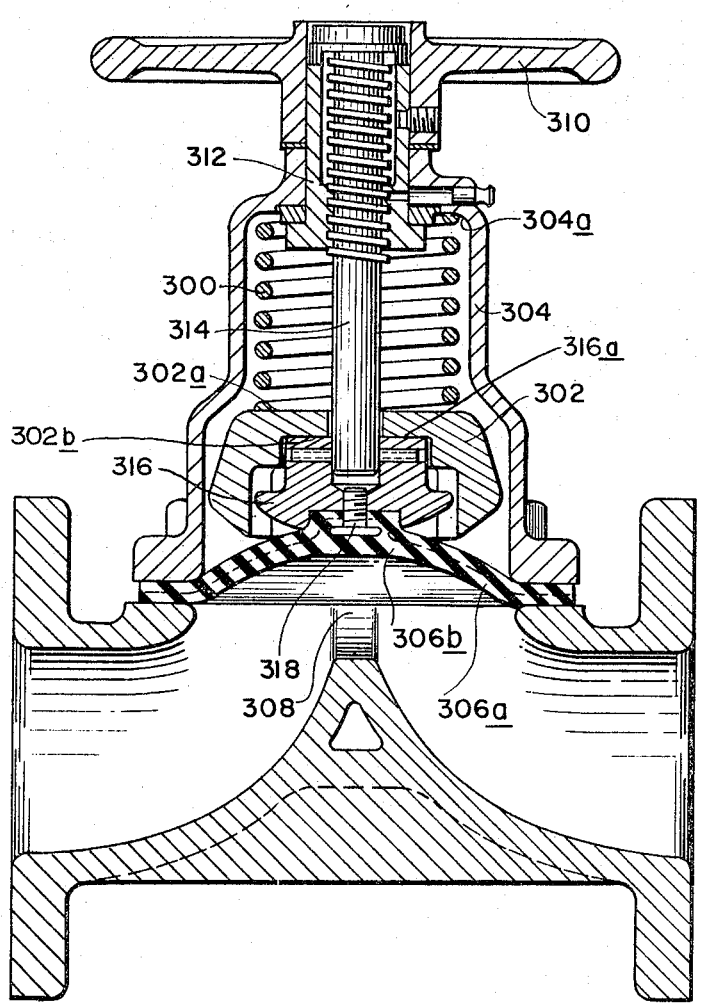
FIGURE 14 is a view like FIG. 1, but showing another embodiment of the invention in which a spring is interposed directly between a compressor piece and the bonnet.

Referring to FIG. 14 of the drawings, this shows an embodiment of the invention in which a compression spring 300 is interposed between the outer compressor piece 302 and the bonnet 304. The lower end of this spring bears against a surface 302a on the outer compressor piece, and the upper end of this spring bears against the inside surface 304a at the end of the bonnet. The spring is precompressed by such an amount that when the outer compressor piece 302 is in its closed position, in which it holds the diaphragm section 306a against the seat 308, the spring, though extended from the position shown in FIG. 14, is still sufficiently deflected to form a tight seal between the diaphragm section 306a and this seat. This outer compressor piece is moved to such closed position by turning the handwheel 310 to turn the internally threaded bushing 312 and thereby feed the externally threaded stem 314 toward the diaphragm seat 308. The inner compressor piece 316, which is pivotally mounted on the lower end of the stem and which holds the outer compressor piece 302 in the lifted position shown, permits the outer compressor piece to move to its closed position when the stem has been moved downwardly a certain amount. Thereafter further turning of the handwheel in the same direction continues the downward movement of the inner compressor piece 316 until it presses the diaphragm section 306b against the seat 308. The valve is then completely closed.

To open the valve the handwheel 310 is rotated in the opposite direction. At first this moves only the stem, the inner compressor piece and diaphragm section 306b, the latter being connected to the inner compressor piece by the usual stud 318 embedded in the diaphragm material and threaded into the inner compressor piece in the well known way. The outer compressor piece holds the diaphragm section 306a against the seat during this first opening movement of the inner compressor piece and until the upper surface 316a of the inner compressor piece engages the surface 302b of the outer compressor piece. Thereafter continued opening movement of the inner compressor piece by the handwheel lifts the outer compressor piece away from its closed position. This lifting further compresses the spring 300, and when the valve is completely open the parts are again in the positions shown in FIG. 14.

Figure 15:
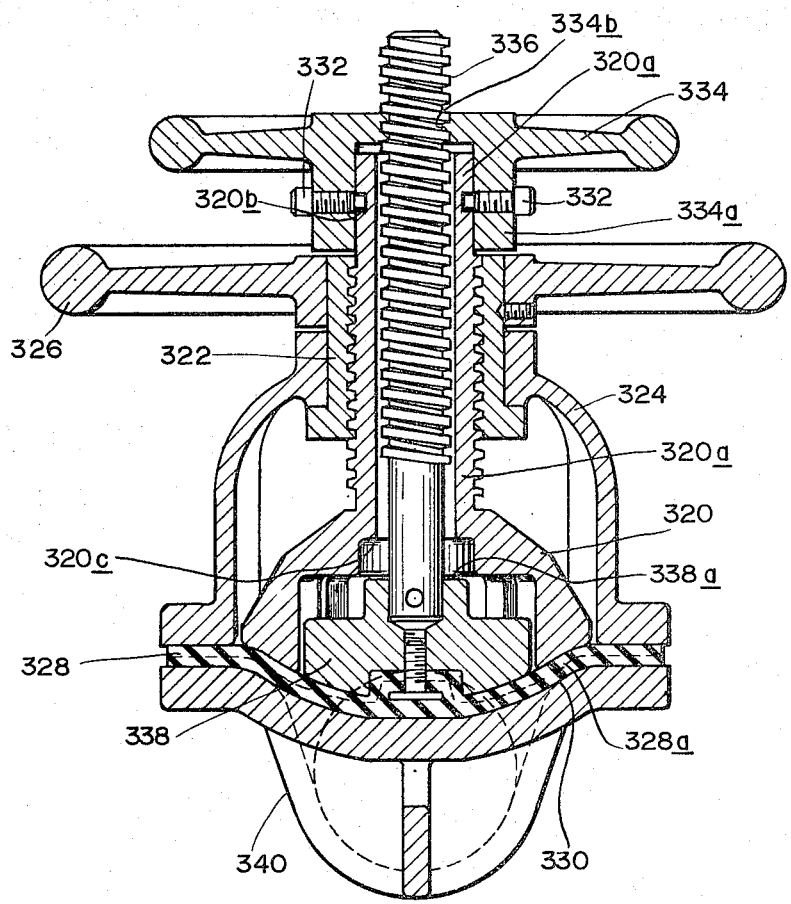
FIGURE 15 is a view like FIG. 3, but showing another embodiment of the invention in which there are no springs, the compressor pieces being moved by separate handwheel actuators.

FIGURE 15 shows another embodiment in which there is no spring. Instead the outer compressor piece 320 has a hollow exteriorly threaded stem casing 320a received in the bushing 322 which is journalled in the bonnet 324 and rotated by a first handwheel 326. Rotating the handwheel 326 in the proper direction lifts the outer compressor piece from the closed position shown, in which it sealingly presses the diaphragm section 328a against the seat 330, to an open position in which it is spaced substantially from this seat. The upper end of stem-casing 320a extends beyond the handwheel 326 and is provided with a circumferential groove 320b. This groove receives the ends of several set-screws 332 mounted in the boss 334a of a second handwheel 334, and by this arrangement the handwheel 334 is permitted to rothe outer compressor piece 385 until the latter is engaged by the inner compressor piece 387. At the time of this engagement the resistance of spring 394 to deflection will have risen to a certain value. Assuming that the pressure in actuator chamber 396e has a value which just balances this spring force the valve will remain in this partly open position. If further opening is then required the pressure in chamber 396e can be increased to further compress spring 394 and to begin to further compressor spring 384. Thus after the inner compressor piece engages the outer compressor piece upward movement of the former carries the latter upward with it to complete the opening of the diaphragm. During closing the air pressure is merely removed from chamber 396e and the springs 384 and 394 return the compressor pieces to their closed positions.

I claim:
1. A diaphragm value comprising:
   (I) a diaphragm,
   (II) a seat for said diaphragm,
   (III) a compressor which:
       (A) is for moving said diaphragm with respect to said seat,
       (B) has a first part which is movable:
           (1) in one direction toward said seat,
           (2) in the opposite direction away from said seat,
       (C) has a second part which is movable:
           (1) in both said directions,
           (2) with respect to said first compressor part,
   (IV) means:
       (A) for holding said second compressor part in a fixed position with respect to said seat,
       (B) for moving said first compressor part in said opposite direction to a predetermined position which:
           (1) is spaced from said seat,
           (2) establishes a flow passage between said diaphragm and said seat,
           while said second compressor part is being held in said fixed position,
       (C) for moving said first compressor part in said opposite direction beyond said predetermined position,
   (V) means responsive to said movement of said first compressor part in said opposite direction beyond said predetermined position:
       (A) for opposing said holding means,
       (B) for moving said second compressor part in said opposite direction from said fixed position,
       (C) for increasing the size of said flow passage.

2. A diaphragm valve comprising:
   (I) a diaphragm having at least two sections,
   (II) a seat for said diaphragm sections,
   (III) a compressor which:
       (A) is for moving said diaphragm with respect to said seat,
       (B) has a first part which is movable:
           (1) in one direction toward said seat,
           (2) in the opposite direction away from said seat,
       (C) has a second part which is movable:
           (1) in both said directions,
           (2) with respect to said first compressor part,
   (IV) means:
       (A) for holding said second compressor part fixed with respect to said seat in a position in which said second compressor part holds one of said diaphragm sections against said seat,
       (B) for simultaneously moving said first compressor part in said opposite direction to a position:
           (1) which is spaced a predetermined distance from said seat,
           (2) in which said first compressor part holds another of said diaphragm sections away from said seat,
           (3) which establishes a flow passage in the region between said other diaphragm section and said seat,
       (C) for moving said first compressor part in said opposite direction beyond said position,
   (V) means responsive to movement of said first compressor part in said opposite direction beyond its said position:
       (A) for moving said second compressor part in said oposite direction from its said fixed position,
       (B) for spreading said flow passage to the region between said one diaphragm section and a said seat.

3. A diaprhagm valve comprising:
   (I) a diaphragm,
   (II) a seat for said diaphragm on one side thereof,
   (III) a compressor which:
       (A) is for moving said diaphragm with respect to said seat,
       (B) is on the opposite side of said diaphragm,
       (C) has a first part which is movable with respect to said seat,
           (1) in one direction theretoward,
           (2) in the opposite direction thereaway from,
       (D) has a second part which:
           (1) is movable with respect to said seat,
               (a) in both said directions,
               (b) to a position:
                   (i) which is spaced a predetermined distance from said seat,
                   (ii) in which said first compressor part supports one section of said diaphragm at a distance from said seat,
                   (iii) which establishes between said other diaphragm section and said seat,
           (2) is holdable in a position:
               (a) which is fixed with respect to said seat,
               (b) in which said second compressor part holds another section of said diaphragm against said seat,
                   while said first compressor part is moving in said opposite direction toward its said position,
   (IV) means for holding said second compressor part in said fixed position,
   (V) means:
       (A) for moving said first compressor part in said opposite direction to its said position while said holding means is holding said second compressor part in its said fixed position,
       (B) for subsequently moving said first compressor part in said opposite direction beyond its said position,
   (VI) means responsive to said subsequent movement of said first compressor part:
       (A) for moving said second compressor part in said opposite direction from its said fixed position in unison with said first compressor part,
       (B) for extending said flow passage to the region between said other diaphragm section and said seat.

4. A diaphragm valve comprising:
   (I) a diaphragm,
   (II) a seat for said diaphragm on one side thereof,
   (III) a compressor which:
       (A) is for moving said diaphragm with respect to said seat,
       (B) is on the opposite side of said diaphragm, tate with respect to the stem-casing 320a but is prevented from moving axially with respect thereto. A portion 334b of the handwheel 334 is threadedly engaged on the upper end of a threaded stem 336 located within the hollow stem casing 320a. The lower end of the stem 336 is connected to the inner compressor piece 338. The compressor pieces 320 and 338 are related to each other, to the diaphragm 328, the body 340 and bonnet 324 in the same manner as in the previous embodiments.

The operation of the FIG. 15 valve is as follows: With the parts in the closed position shown one kind of opening can be accomplished by merely rotating handwheel 326. This would lift both compressor pieces 320 and 338 without changing their relative positions with respect to each other because stem 336 is mounted on the handwheel 334 which is in turn mounted on stem casing 320a which is in turn mounted on bushing 322. This mode of opening is similar to that of a standard diaphragm valve having only one compressor piece. However, opening can also be accomplished by first rotating only the handwheel 334, again starting with the parts in the closed positions of FIG. 15. The effect of rotating handwheel 334 is to lift stem 336 relative to stem casing 320a and thereby lift the inner compressor piece 338 away from the seat. This lifts the center portion of the diphragm away from the seat while the outer compressor piece 320 continues to hold the outer diaphragm portion 328a against the seat. When rotation of handwheel 334 causes the inner compressor piece surface 338a to engage the outer compressor piece surface 320c further opening by handwheel 334 is not possible, and if further opening is desired the handwheel 326 is rotated to lift both the outer compressor piece and the inner compressor piece in its new relative position with respect thereto. To close the valve after this last-described opening the handwheel 326 may be rotated first to close the outer compressor piece and then the handwheel 334 may be rotated to close the inner compressor piece. Or the handwheel 334 may be operated first and then the handwheel 326.

Figure 16:
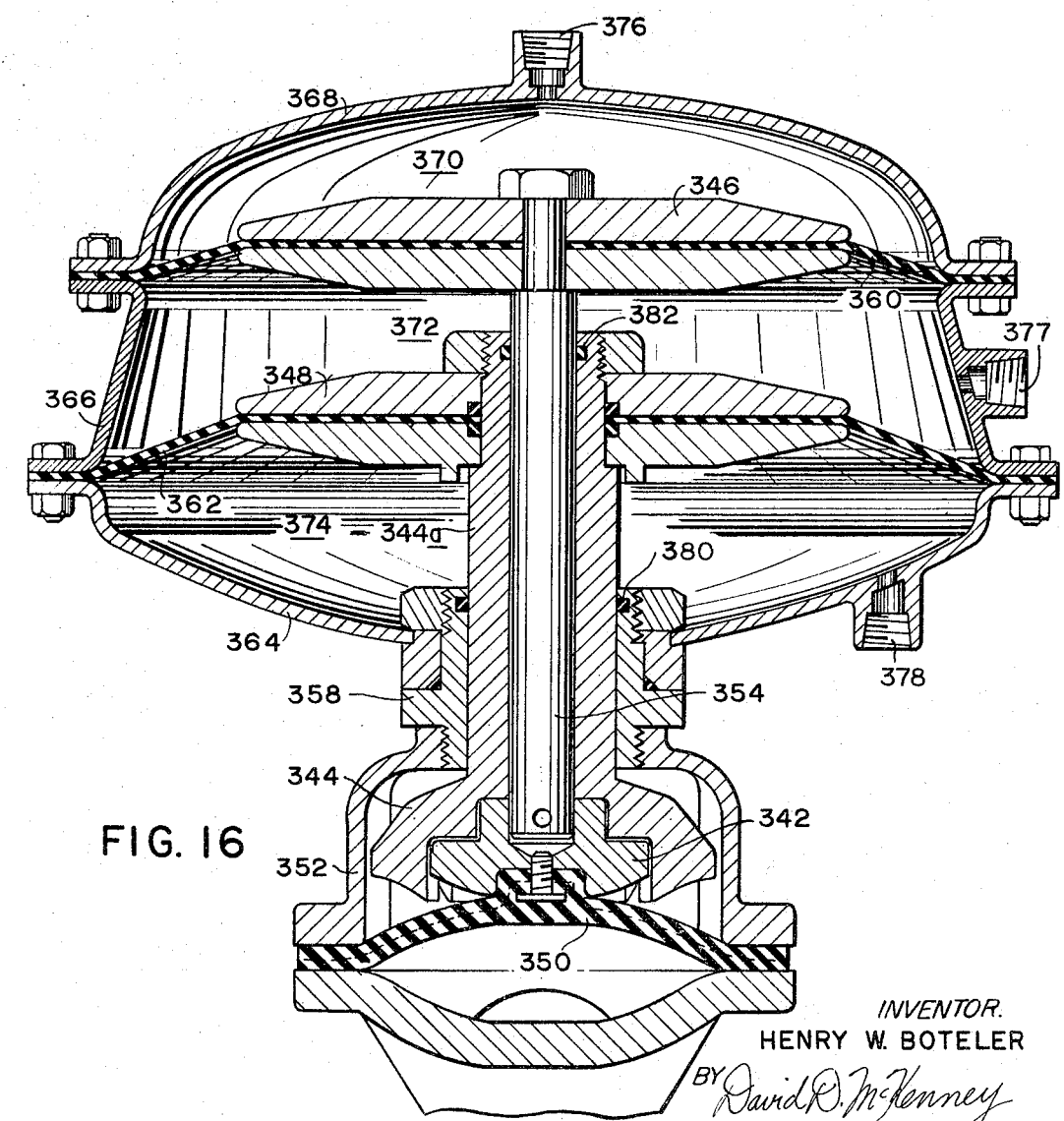
FIGURE 16 is a view like FIG. 3, but showing another embodiment in which there are no springs and each compressor piece is moved in both directions by a separate air actuator.

FIGURE 16 shows another embodiment in which there is no spring and in which the compressor pieces 342 and 344 are operated by air driven pistons 346 and 348, respectively. More particularly, the arrangement of these compressor pieces with respect to each other and to the diaphragm 350 and bonnet 352 is the same as in the other embodiments, but the inner compressor piece 342 is connected to the lower end of a stem 354 which is slidingly and sealingly mounted in a hollow stem casing 344a and has its upper end connected to the actuator piston 346. The outer compressor piece 344 is connected to the stem casing 344a which is in turn slidingly and sealingly mounted in the bonnet end journal 358 and has its upper end connected to the actuator piston 348. Diaphragms 360 and 362 and actuator casing members 364, 366 and 368 permit movement of the actuator pistons and divide the actuator into three air pressure chambers 370, 372 and 374. Air connections 376, 377 and 378 in the casing members admit and exhaust air pressure to the chambers. The bonnet end journal 358 is threadedly secured to the bonnet end and serves as a mounting for the actuator casing member 364. The casing member 366 is secured to member 364 at the circumferential flanges of both said members between which the periphery of diaphragm 362 is clamped. The casing members 366 and 368 and diaphragm 360 are assembled together in a similar fashion. The diaphragms and casing members are sized so that the effective area of piston 346 and diaphragm 360 on which pressure in chamber 372 acts is substantially less than the effective area of piston 348 and diaphragm 362 on which this same pressure acts. Pressure in chamber 374 is prevented from escaping between the sliding stem casing 344a and bonnet end journal 358 by an O-ring seal 380. Pressure in chamber 372 is prevented from escaping between the sliding stem 354 and the stem casing 344a by another O-ring seal 382.

Assume in this embodiment that one value of air pressure is available and that the system conducting it to the actuator permits introduction of this pressure into any one or two or all of the chambers in any sequence. The operation of this embodiment would be as follows: The open positions of the parts shown in FIG. 16 are maintained by having pressure in chambers 372 and 374 and by having chamber 370 exhausted. To begin closing the valve chamber 374 is exhausted while the pressure is maintained in chamber 372 and while chamber 370 remains exhausted. The pressure in chamber 372 tries to separate the pistons 346 and 348 which are as far apart as they can get in FIG. 16 because the inner compressor piece 342 is abutting the outer compressor piece 344. In these relative positions both pistons move downwardly because of the difference in piston and diaphragm areas. This closes the outer compressor piece 344. Next pressure is introduced into chamber 370 while pressure is kept in chamber 372 and chamber 374 remains exhausted. This advances the inner compressor piece 342 towards the valve seat and thereby completes closure of the valve.

To open the valve chamber 370 is first exhausted, leaving pressure in chamber 372 and leaving chamber 374 exhausted. This lifts the inner compressor piece until it abuts the outer compressor piece. Then pressure is introduced into chamber 374 while pressure is left in chamber 372 and chamber 370 remains exhausted. This lifts outer compressor piece to its open position and also further lifts the inner compressor piece to a more open position, completing the opening of the valve.

Figure 17:
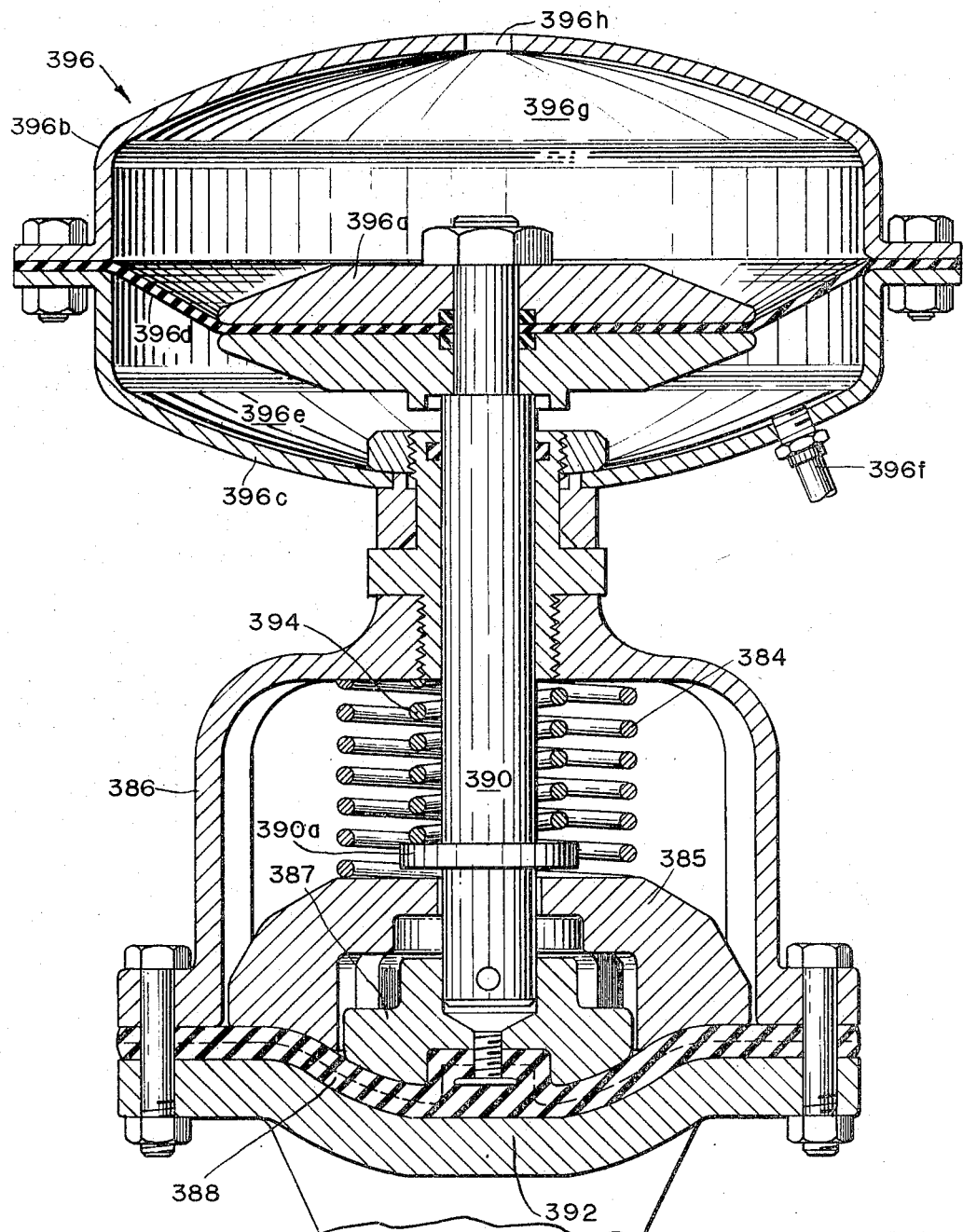
FIGURE 17 is a view like FIG. 3, but showing an embodiment in which there are two springs so arranged that the valve is closed by spring force and opened by an actuator.

FIGURE 17 shows an embodiment of the invention in which two springs are used to hold the valve in the completely closed position when all opening forces are released. Thus one spring 384 is arranged in a manner similar to spring 300 of FIG. 14 between the outer compressor piece 385 and the bonnet 386. As in the other embodiments, the inner compressor piece 387 is connected to the diaphragm 388 and mounted on the lower end of a stem 390 which extends upwardly through the upper end of the bonnet 386. In the positions of the parts shown in FIG. 17 the two compressor pieces are holding the diaphragm against its seat 392, so that the valve is in its completely closed position. Spring 384 is holding the outer compressor piece closed because it is precompressed, that is it is substantially deflected in the position shown. A second spring 394 located between the bonnet end and a flange 390a on the stem is also precompressed in the position shown and serves to hold the inner compressor piece 387 in the closed position. The upper end of the stem 390 is secured to the piston 396a of an air pressure actuator 396 which also includes a pair of casing members 396b and 396c and an annular diaphragm 396d. The diaphragm has its outer periphery clamped between the casing members and its inner portion connected to the piston. The lower casing member 396c is mounted on the bonnet 386 around the aperture through which the stem extends. Air pressure is introduced into chamber 396e below the piston through a fitting 396f. The chamber 396g above the piston is open to atmosphere through aperture 396h.

The operation of this embodiment of FIG. 17 is as follows: Chamber 396e is exhausted when the parts are in the positions shown. Hence the two springs 384 and 394 are unopposed by the actuator 396 and hold the compressor piece downwardly with enough force to seal the diaphragm against the seat 392 and close the valve. However, when air pressure is introduced into actuator chamber 396e through fitting 396f it begins to move the piston 396a upwardly. This in turn moves the stem upwardly and lifts the inner compressor piece 387 until it abuts the outer compressor piece 385. During this initial movement spring 394 is further compressed and the center of the diaphragm is lifted from its seat. The outer edges of the diaphragm continue to be held against the seat by (C) has a first part which is movable with respect to said seat:
- (1) in one direction theretoward,
- (2) in the opposite direction thereaway from,
- (3) between:
  - (a) a first position in which it holds one section of said diaphragm against said seat,
  - (b) a second position:
    - (i) which is spaced in said opposite direction from said first position,
    - (ii) in which it holds said one diaphragm section away from said seat,
    - (iii) in which it establishes a flow passage in the region between said one diaphragm section and said seat,
  - (c) a third position:
    - (i) which is spaced in said opposite direction from said second position,
    - (ii) in which it holds said one diaphragm section further away from said seat,
    - (iii) in which it increases said flow passage in said region between said one diaphragm section and said seat, (D) has a second part which:
- (1) is movable with respect to said seat,
  - (a) in both said directions,
  - (b) between:
    - (i) a first position in which it holds another section of said diaphragm against said seat,
    - (ii) a second position:
      - (o) which is spaced in said opposite direction from said first position,
      - (oo) in which it supports said other diaphragm section at a distance from said seat,
      - (ooo) in which said flow passage is extended into the distance between said other diaphragm section and said seat,
- (2) is holdable in its said first position while said first compressor part is moving between its said first and second positions, (IV) means for holding said second compressor part in its first position,
(V) means:
- (A) for moving said first compressor part in said opposite direction to its second position while said holding means is holding said second compressor part in its said first position,
- (B) for moving said first compressor part beyond its said second position toward its said third position, (VI) means responsive to movement of said first compressor part in said opposite direction beyond its said second position for moving said second compressor part in said opposite direction from its said first position toward its said second position.

5. A diaphragm valve comprising:
(I) a diaphragm,
(II) a seat for said diaphragm,
(III) a compressor which:
- (A) is connected to said diaphragm for moving several sections thereof with respect to said seat,
- (B) has a first part which is movable:
  - (1) in one direction toward said seat to press one section of said diaphragm thereagainst,
  - (2) in the opposite direction to pull said one diaphragm section away from said seat and establish an initial flow passage in the region between said one diaphragm section and said seat,
- (C) has a second part which:
  - (1) is movable:
    - (a) in one direction toward said seat to press another section of said diaphragm thereagainst,
    - (b) in the opposite direction to allow said other diaphragm section to move away from said seat and extend said initial flow passage into the region between said other diaphragm section and said seat,
  - (2) is holdable in a fixed position with respect to said seat to maintain said other diaphragm section pressed thereagainst while said first compressor part is moving,
  - (3) is engaged by said first compressor part upon a certain amount movement thereof in said opposite direction with respect to said second compressor part,
  - (4) is moved by said first compressor part engaged thereagainst upon further movement of said compressor part in said opposite direction,
(IV) means for holding said second compressor part in said fixed position,
(V) means for moving said first compressor part:
- (A) in said opposite direction,
- (B) while said holding means is holding said second compressor part in said fixed position,
- (C) to establish said initial flow passage,
- (D) until it engages said second compressor part,
- (E) farther in said opposite direction after said engagement:
  - (1) to move said first and second compressor parts,
  - (2) to extend said initial flow passage.

6. A diaphragm valve according to claim 5 wherein said holding means is a spring connected to said second compressor part.

7. A diaphragm valve according to claim 6 wherein said spring is connected between said second compressor part and said means for moving said first compressor part.

8. A diaphragm valve comprising:
(I) a body having:
- (A) a bore therethrough,
- (B) a diaphragm opening on one side of said bore,
- (C) a diaphragm seat opposite said opening,
(II) a bonnet which:
- (A) is at said opening,
- (B) is secured to said body,
(III) a diaphragm which:
- (A) has its peripheral portion clamped between said body and bonnet,
- (B) has its central portion:
  - (1) covering said opening,
  - (2) movable into and out of engagement with said seat,
(IV) an actuating mechanism which:
- (A) is mounted on said bonnet,
- (B) comprises:
  - (1) a first compressor part which:
    - (a) is connected to a first section of said central diaphragm portion,
    - (b) is movable toward said body during valve closing to carry said first diaphragm section against said seat,
    - (c) is movable away from said body during valve opening to lift said first diaphragm section from said seat and to establish a flow passage in the region between said first diaphragm section and said seat,
(2) a second compressor part which:
(a) is carried on said first compressor part,
(b) is movable with respect to said first compressor part,
(c) is adjacent a second section of said diaphragm central portion,
(3) means associated with said first and second compressor parts:
(a) for permitting movement of said first part during valve closing after said second part has carried said second diaphragm section against said seat and is stationary with respect thereto,
(b) for causing said second part to hold second diaphragm section against said seat during valve opening and to remain stationary with respect thereto when said first part is lifting said first diaphragm section away from said seat,
(c) for causing said first part to move said second part away from said seat and extend said flow passage to the region between said second diaphragm section and said seat after a predetermined movement of said first part away from seat.

9. A diaphragm valve comprising:
(I) a body having:
(A) a bore therethrough,
(B) a diaphragm opening on one side of said bore,
(C) a diaphragm seat opposite said opening,
(II) a bonnet which:
(A) is located at said opening,
(B) is secured to said body,
(III) a diaphragm which:
(A) has a peripheral portion clamped between said body and bonnet,
(B) has a central portion which:
(1) covers said opening,
(2) comprises first and second sections movable into and out of engagement with said seat,
(IV) an actuating mechanism which:
(A) is mounted on said bonnet,
(B) comprises:
(1) a first compressor part which:
(a) is connected to said first diaphragm section,
(b) is movable with respect to said seat,
(c) holds said first diaphragm section away from said seat to provide an initial flow passage in the region between said first diaphragm section and said seat in one partly open position of the valve,
(d) holds said first diaphragm section against said seat to close said initial flow passage in the completely closed position of the valve,
(e) has a lost motion connection surface,
(2) a second compressor part which:
(a) is adjacent said second diaphragm section,
(b) is movable with respect to said seat and said first compressor part,
(c) holds said second diaphragm section against said seat in said partly open and completely closed valve positions,
(d) permits said second diaphragm section to move away from said seat to extend said flow passage to the region between said second diaphragm section and said seat in the completely open position of the valve,
(e) has a lost motion connection surface which:
(i) is spaced from said lost motion connection surface on said first compressor part in said completely closed valve position,
(ii) is engaged by said lost motion connection surface on said first compressor part in said partly open valve position,
(3) means for biasing said second compressor part toward said seat to squeeze said second diaphragm section thereagainst in said partly open and completely closed valve positions,
(4) means:
(a) for moving said first compressor part toward said seat to hold said first diaphragm section against said seat in said completely closed valve position,
(b) for moving said first compressor part away from said seat to hold said first diaphragm section away from said seat in said partly open valve position,
(c) for further moving said first compressor part away from said seat to cause said lost motion connection surface on said first compressor part to engage said lost motion connection surface on said second compressor part and to cause said first compressor part to move said second compressor part away from said seat to permit said second diaphragm section to move away from said seat toward said completely open valve position.

10. A diaphragm valve comprising:
(I) a body having:
(A) a bore therethrough,
(B) a diaphragm opening on one side of said bore,
(C) a diaphragm seat opposite said opening,
(II) a bonnet which:
(A) is located at said opening,
(B) is secured to said body,
(III) a diaphragm which:
(A) has its peripheral portion clamped between said body and bonnet,
(B) has its central portion:
(1) covering said opening,
(2) movable into and out of engagement with said seat,
(IV) an actuating mechanism which:
(A) is mounted on said bonnet,
(B) comprises:
(1) a first compressor part which:
(a) is connected to a first section of said central diaphragm portion,
(b) is movable in a first direction from a first position in which it is separated from said seat only by said first diaphragm section to a second position in which it is spaced a predetermined distance from its said first position and thereby forms an initial flow passage in the region between first diaphragm section and seat, to a third position in which it is further spaced from its said first position and thereby forms a larger flow passage in the region between said first diaphragm section and seat, (2) means for moving said first compressor part between its said first, second and third positions, (3) a second compressor part which:
    (a) is adjacent a second section of said diaphragm central portion,
    (b) is movable with respect to said first compressor part,
    (c) is movable in said first direction from a first position in which it is separated from said seat only by said second diaphragm section to a second position in which it is spaced from its said first position and thereby extends said flow passage into the region between said second diaphragm section and seat, (4) means:
    (a) for maintaining said second compressor part in its first position while said first compressor part is moving between its first and second positions,
    (b) for moving said second compressor part to its second position during movement of said first compressor part between its second and third positions.

11. A diaphragm valve comprising:
(I) a body having:
    (A) a bore therethrough,
    (B) a diaphragm opening on one side of said bore,
    (C) a diaphragm seat opposite said opening,
(II) a bonnet which:
    (A) is located at said opening,
    (B) is secured to said body,
(III) a diaphragm which:
    (A) has its peripheral portion clamped between said body and bonnet,
    (B) has its central portion:
        (1) covering said opening,
        (2) movable into and out of engagement with said seat,
(IV) an actuating mechanism which:
    (A) is mounted on said bonnet,
    (B) comprises:
        (1) a first compressor part which:
            (a) is connected to a first section of said central diaphragm portion,
            (b) has a surface which:
                (i) is presented toward said first diaphragm section,
                (ii) has substantially the contour of said first diaphragm section when said first diaphragm section is engaging said seat,
            (c) is movable with respect to said body and bonnet from a first position in which:
                (i) said first compressor part surface is:
                      (o) spaced substantially from said seat,
                      (oo) out of engagement with substantial areas of said first diaphragm section,
                (ii) a flow passage is provided in the region between said first diaphragm section and said seat,
            to a second position in which:
                (i) said first compressor part surface is:
                      (o) still spaced from said seat,
                      (oo) still out of engagement with substantial areas of said first diaphragm section,
                      (ooo) closer to said seat than in said first position,
                (ii) said flow passage is reduced, to a third position in which:
                (i) said first compressor part surface is:
                    (o) closely adjacent said seat,
                    (oo) in engagement with substantially the entire first diaphragm section,
                (ii) said flow passage is closed, (2) means for moving said first compressor part between its said first, second and third positions, (3) a second compressor part which:
    (a) is carried on said first compressor part,
    (b) is movable with respect to said first compressor part,
    (c) has a surface which:
        (i) is presented toward a second section of said central diaphragm portion,
        (ii) has substantially the contour of said second diaphragm section when said second diaphragm section is engaging said seat,
    (d) is movable from a first position:
        (i) which corresponds to the first position of said first compressor part,
        (ii) in which:
            (o) said second compressor part surface is spaced from said seat,
            (oo) said second compressor part surface is out of engagement with substantial areas of said second diaphragm section,
            (ooo) said flow passage is extended into the region between said second diaphragm section and said seat,
    to a second position:
        (i) which corresponds to both the second and third positions of said first compressor part,
        (ii) in which:
            (o) said second compressor part surface is closely adjacent said seat,
            (oo) said second compressor part surface is in engagement with substantially the entire second diaphragm section,
            (ooo) said flow passage is closed.

(4) means:
    (a) for maintaining said second compressor part in its second position while said first compressor part is in its said first and second positions and therebetween,
    (b) for moving said second compressor part from its second position toward its first position upon movement of said first compressor part from its second position towards its first position.

12. A diaphragm valve according to claim 11 in which said first section of said central diaphragm portion is at the center of said central diaphragm portion and in which said second section of said central diaphragm portion is an annular section surrounding said first section.

13. A diaphragm valve according to claim 12 in which said diaphragm central portion is substantially entirely formed of said first and second diaphragm sections.

14. A diaphragm valve according to claim 13 in which said body opening has a rim therearound, in which said diaphragm peripheral portion is clamped to said rim, in which said body seat is a concaved weir surface having its ends blending into said rim on opposite sides of said body opening, in which said first section of said diaphragm central portion overlies the center of said weir surface, and in which said second section of said diaphragm central portion overlies the ends of the weir surface.

15. A diaphragm valve according to claim 14 in which said second compressor part has a recess surrounded by said second compressor part surface, in which said first compressor part is located in and movable in said recess, in which said compressor part surfaces together form a smooth continuous contour when said first compressor part is in its third position and said second compressor part is in its second position, and in which said first compressor part surface is retracted into said recess when said first compressor part is in its first and second positions.

16. A diaphragm valve according to claim 15 in which said means for maintaining said second compressor part in its second position comprises a spring unit connected between second compressor part and one of said first compressor part and bonnet.

17. A diaphragm valve according to claim 16 in which said second compressor part recess has an end wall, in which said first compressor part is in engagement with said end wall in its first and second positions.

18. A diaphragm valve according to claim 17 in which said second compressor part has an aperture in said end wall, in which said first compressor part has an elongated portion extending through said aperture, and in which said spring unit is a compression spring unit confined between said second compressor part and said extending portion.

19. A diaphragm valve according to claim 18 in which said compression spring unit comprises a nest of apertured disc springs mounted on said elongated portion of said first compressor part.

20. A diaphragm valve according to claim 18 in which said compression spring unit comprises a plurality of compression springs located adjacent said elongated portion of said first compressor part.

21. A diaphragm valve according to claim 18 in which said elongated portion of said first compressor part is a separate stem which is pivotally connected to the remainder of said first compressor part.

22. A diaphragm valve according to claim 11 in which there are first means on said bonnet for guiding the movement of said second compressor part with respect to said bonnet and for preventing rotation of said second compressor part with respect to said bonnet, and in which there are second means on said second compressor part for guiding the movement of said first compressor part with respect to said second compressor part and for preventing rotation of said first compressor part with respect to said second compressor part.

23. A diaphragm valve according to claim 18 in which a portion at the center of said concaved weir surface is in turn concaved with respect thereto.

24. A diaphragm valve comprising:
(I) a body member having:
(A) a bore therethrough,
(B) a diaphragm opening which:
(1) is on one side of said bore,
(2) has a rim therearound,
(C) a diaphragm seat opposite said opening,
(II) a diaphragm having:
(A) a central portion which:
(1) covers said opening,
(2) which has a connection thereon,
(3) has a first section in the region of said connection,
(4) has a second angular section adjacent to and surrounding said first section,
(B) a peripheral portion overlying said opening rim,
(III) means fixed with respect to said body member for sealingly squeezing said diaphragm peripheral portion against said body opening rim,
(IV) an actuating mechanism which:
(A) is located on the side of said diaphragm central portion opposite said seat,
(B) comprises:
(1) a stem mounting fixed with respect to said body member,
(2) a stem which:
(a) is mounted in said stem mounting,
(b) is movable in said stem mounting with respect to said body member:
(i) in a first direction toward said diaphragm seat,
(ii) in a second opposite direction away from said diaphragm seat,
(3) a first compressor part which:
(a) is carried on and movable with said stem,
(b) forms an assembly with said stem,
(c) is secured to said diaphragm central portion connection,
(d) overlies said first diaphragm central portion section,
(4) a second compressor part which:
(a) is movable with respect to said body member:
(i) in said first and second directions,
(ii) with respect to said first compressor part and stem assembly,
(b) overlies said second diaphragm central portion section,
(c) has a surface engaged by said assembly after a predetermined amount of movement thereof in said second direction,
(d) is moved by said assembly in said second direction upon further movement of said assembly in said second direction after said engagement,
(5) a spring which:
(a) engages said second compressor part,
(b) urges said second compressor part in said first direction,
whereby said spring causes said second compressor part to squeeze said second diaphragm section against said body seat while said assembly is out of engagement with said second compressor part surface, whereby movement of said stem in first direction carries said first compressor part to a first position in which it squeezes said first diaphragm section against said body seat, whereby said predetermined amount of movement of said assembly in said second direction carries said first compressor part from said first position to a second position in which a flow passage is established in the region between said first diaphram section and said seat and in which said assembly engages said second compressor part surface, and whereby further movement of said assembly in said second direction after said engagement moves said second compressor part away from said body seat and extends said flow passage to the region between said second diaphragm section and said seat.

25. A diaphragm valve according to claim 24 wherein said spring is connected between said second compressor part and said assembly.

26. A diaphragm valve according to claim 25 wherein said spring is connected between said second compressor part and said stem.

27. A diaphragm valve according to claim 24 wherein said spring is connected between said second compressor part and said means for sealingly squeezing said diaphragm peripheral portion.

28. A diaphragm valve according to claim 24 wherein said spring also engages said means for sealingly squeezing said diaphragm peripheral portion, and wherein another spring is connected between said assembly and said means for sealingly squeezing said diaphragm peripheral portion.

29. A diaphragm valve according to claim 5 wherein said holding means comprises a first handwheel assembly connected to said second compressor part, wherein said moving means comprises a second handwheel assembly connected to said first compressor part and further comprises said first handwheel assembly, and wherein said second handwheel assembly is mounted on said first handwheel assembly.

30. A diaphragm valve according to claim 5 wherein said holding means comprises a first fluid-pressure operated piston member connected to said second compressor part, and wherein said moving means comprises a second fluid-pressure operated piston member connected to said first compressor part.

31. A diaphragm valve according to claim 30 wherein said first piston member is located between said second piston member and said compressor parts, wherein said piston members define opposite ends of a common fluid pressure chamber, and wherein said first piston member has a larger effective area in said chamber than said second piston member.

32. A diaphragm valve for controlling the flow of a fluid comprising:
(I) a body having:
(A) a passage for containing said fluid,
(B) a diaphragm opening which:
(1) is in one side of said body,
(2) communicates with said passage,
(C) a diaphragm seat which:
(1) is opposite said opening,
(2) comprises at least one continuous surface,
(II) a diaphragm which:
(A) covers said opening,
(B) has at least first and second sections which are movable:
(1) in one direction toward said seat surface,
(2) in the opposite direction away from said seat surface,
(III) means outside said passage and engaging said diaphragm:
(A) for holding said second diaphragm section against said seat surface,
(B) for moving said first diaphragm section:
(1) in said opposite direction to a position in which:
(a) said first diaphragm section is spaced from said seat surface,
(b) a flow path is established in the part of said passage between said first diaphragm section and said seat surface,
(2) while said second diaphragm section is being held against said seat surface,
(C) for releasing the said holding of said second diaphragm section against said seat surface,
(D) for moving said second diaphragm section:
(1) in said opposite direction,
(2) away from said seat surface,
(3) to a position in which:
(a) said second diaphragm section is spaced from said seat surface,
(b) a flow path is established in the part of said passage between said second diaphragm section and said seat surface.

33. A diaphragm valve for controlling the flow of fluid comprising:
(I) a body having:
(A) a passage for containing said fluid,
(B) a diaphragm opening which:
(1) is in one side of said body,
(2) communicates with said passage,
(C) a diaphragm seat which:
(1) is opposite said opening,
(2) comprises at least one surface which:
(a) is continuous,
(b) has first and second portions,
(II) a diaphragm which:
(A) covers said opening,
(B) has at least first and second sections which:
(1) are adjacent said first and second seat surface portions respectively,
(2) are each movable,
(a) in one direction toward said adjacent seat surface portion,
(b) in the opposite direction away from said adjacent seat surface portion,
(III) means outside said passage and engaging said diaphragm:
(A) for holding said second diaphragm section against said second seat surface portion,
(B) for moving said first diaphragm section:
(1) in said opposite direction to a position in which:
(a) said first diaphragm section is spaced from said first seat surface portion,
(b) a flow path is established in the part of said passage between said first diaphragm section and said first seat surface portion,
(2) while said second diaphragm section is being held against said second seat surface portion,
(C) for releasing the said holding of said second diaphragm section against said second seat surface portion,
(D) for moving said second diaphragm section:
(1) in said opposite direction,
(2) away from said second seat surface portion,
(3) to a position in which:
(a) said second diaphragm section is spaced from said second seat surface portion,
(b) said flow path is increased to include the part of the passage between said second diaphragm section and said second seat surface portion.

34. A diaphragm valve for controlling the flow of a fluid comprising:
(I) a body having:
(A) a passage for containing said fluid,
(B) a diaphragm opening which:
(1) is in one side of said body,
(2) communicates with said passage,
(3) has a rim,
(C) a diaphragm seat which:
(1) is opposite said opening, (2) comprises a single strip which:
   (a) is continuous,
   (b) has ends joining said opening rim,
(II) a diaphragm which:
  (A) covers said opening,
  (B) sealingly engages said opening rim,
  (C) has at least first and second sections which are movable:
    (1) in one direction toward said seat strip,
    (2) in the opposite direction away from said seat strip,
(III) means outside said passage and engaging said diaphragm:
  (A) for holding said second section against said seat strip,
  (B) for moving said first section:
    (1) in said opposite direction to a position in which:
      (a) said first section is spaced from said seat strip,
      (b) a flow path is established in the part of said passage between said first section and said seat strip,
    (2) while said second section is being held against said seat strip,
  (C) for releasing the said holding of said second section against said seat strip,
  (D) for further moving said first section:
    (1) in said opposite direction,
    (2) beyond said position,
  (E) for moving said second section:
    (1) in said opposite direction,
    (2) away from said seat strip,
    (3) to a position in which:
      (a) said section section is spaced from said seat strip,
      (b) a flow path is established in the part of said passage between said second section and said seat strip,
    (4) while said first section is being further moved.

References Cited by the Examiner

UNITED STATES PATENTS

| | | | |
|---|---|---|---|
| 2,388,988 | 11/1945 | Mueser | 251—331 XR |
| 2,388,989 | 11/1945 | Mueser | 251—331 XR |
| 2,966,928 | 1/1961 | Fairchild | 251—331 XR |
| 3,060,960 | 10/1962 | Waterfill. | |

ALAN COHAN, *Primary Examiner.*